United States Patent
Rao et al.

(10) Patent No.: US 12,473,528 B2
(45) Date of Patent: Nov. 18, 2025

(54) ***ESCHERICHIA COLI* FOR SYNTHESIZING L-VALINE, CONSTRUCTION METHOD AND USE THEREOF**

(71) Applicant: JIANGNAN UNIVERSITY, Wuxi (CN)

(72) Inventors: Zhiming Rao, Wuxi (CN); Yanan Hao, Wuxi (CN); Meijuan Xu, Wuxi (CN); Xuewei Pan, Wuxi (CN); Jiajia You, Wuxi (CN); Taowei Yang, Wuxi (CN); Xian Zhang, Wuxi (CN); Mingling Shao, Wuxi (CN)

(73) Assignee: JIANGNAN UNIVERSITY, Wuxi (CN)

( * ) Notice: Subject to any disclaimer, the term of this patent is extended or adjusted under 35 U.S.C. 154(b) by 20 days.

(21) Appl. No.: 18/420,028

(22) Filed: Jan. 23, 2024

(65) Prior Publication Data

US 2024/0158737 A1    May 16, 2024

Related U.S. Application Data

(63) Continuation of application No. PCT/CN2022/099472, filed on Jun. 17, 2022.

(30) Foreign Application Priority Data

Mar. 21, 2022  (CN) .................. 202210277913.2

(51) Int. Cl.
| | | |
|---|---|---|
| *C12N 1/20* | (2006.01) | |
| *C12N 1/21* | (2006.01) | |
| *C12N 9/10* | (2006.01) | |
| *C12N 9/88* | (2006.01) | |
| *C12N 15/70* | (2006.01) | |
| *C12P 13/08* | (2006.01) | |
| *C12R 1/19* | (2006.01) | |

(52) U.S. Cl.
CPC ........... *C12N 1/205* (2021.05); *C12N 9/1096* (2013.01); *C12N 9/88* (2013.01); *C12N 15/70* (2013.01); *C12P 13/08* (2013.01); *C12Y 206/01042* (2013.01); *C12Y 402/01009* (2013.01); *C12Y 402/01012* (2013.01); *C12R 2001/19* (2021.05)

(58) Field of Classification Search
None
See application file for complete search history.

(56) References Cited

FOREIGN PATENT DOCUMENTS

| | | |
|---|---|---|
| CN | 108913642 A | 11/2018 |
| CN | 110468092 A | 11/2019 |
| CN | 110607268 A | 12/2019 |
| CN | 113278568 A | 8/2021 |
| CN | 113278641 A | 8/2021 |
| CN | 114717172 A | 7/2022 |

OTHER PUBLICATIONS

Gao et al., Engineering of microbial cells for L-valine production, Microb. Cell Fact. 20, 2021, 172. (Year: 2021).*

* cited by examiner

*Primary Examiner* — Todd M Epstein
(74) *Attorney, Agent, or Firm* — SZDC Law PC

(57) ABSTRACT

The invention provides an *Escherichia coli* for synthesizing L-valine, a construction method and use thereof. The *Escherichia coli* of the invention is designated as *Escherichia coli* W3110 and was deposited in China Center for Type Culture Collection (Address: Bayi Road, Wuchang District, Wuhan City, Hubei Province) under the Accession No. CCTCC M 2022293 on Mar. 18, 2022. The recombinant *Escherichia coli* takes *Escherichia coli* as a starting strain, and a transcription regulation factor is overexpressed to obtain a recombinant *Escherichia coli*. The recombinant *Escherichia coli* for synthesizing L-valine of the invention is fermented in a 5 L fermentor with trace dissolved oxygen to test strains, the yield of L-valine reaches 112 g/L, and the OD of the bacterium is 104.

5 Claims, 1 Drawing Sheet

Specification includes a Sequence Listing.

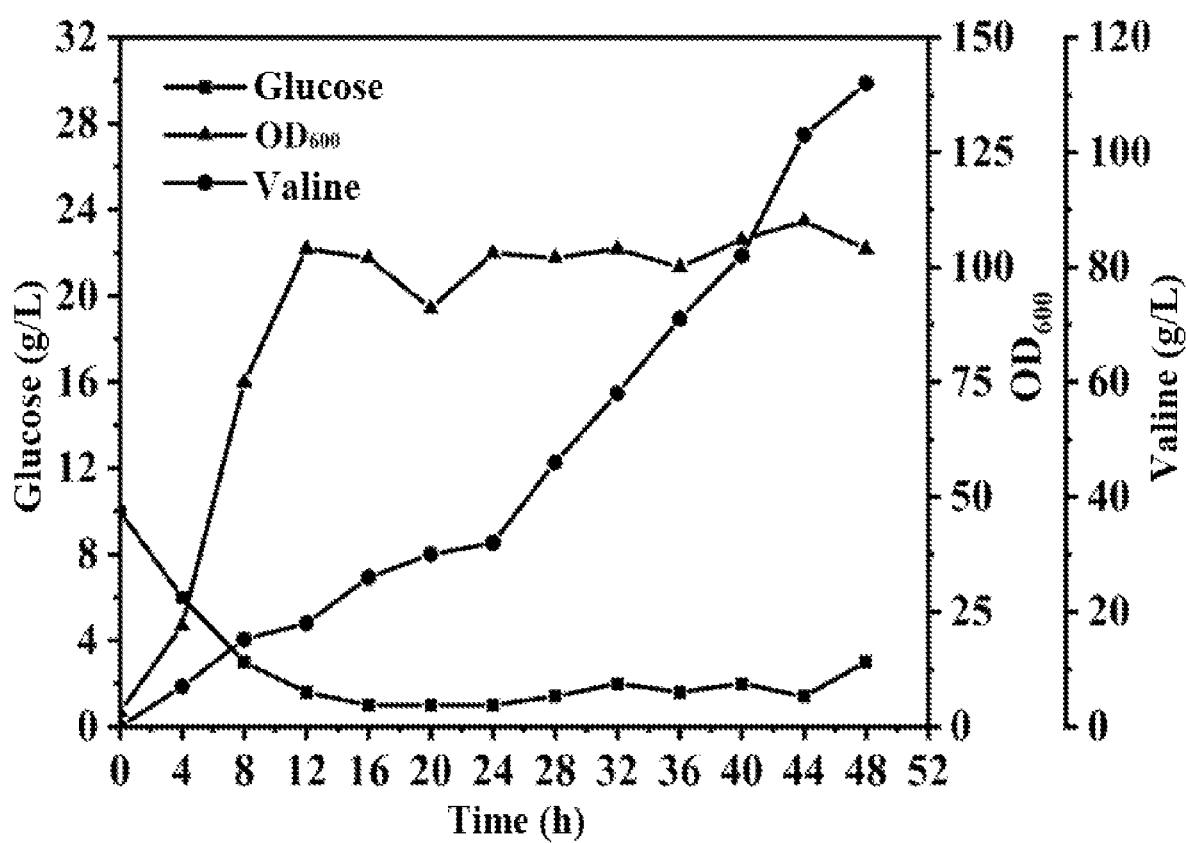

SEQUENCE LISTING

```
Sequence total quantity: 16
SEQ ID NO: 1            moltype = DNA  length = 21
FEATURE                 Location/Qualifiers
source                  1..21
                        mol_type = other DNA
                        organism = synthetic construct
SEQUENCE: 1
aatagttgtt gccgcctgag t                                       21

SEQ ID NO: 2            moltype = DNA  length = 143
FEATURE                 Location/Qualifiers
source                  1..143
                        mol_type = other DNA
                        organism = synthetic construct
SEQUENCE: 2
agagtgtacg cttaacgatt gttaatatta taaatagact gaatgaatat cttaacctta   60
tcagactgat gggcttctta acacccttat aagtgtaaag ccacgaaaac ggttgctgat  120
tgcaaaacag gcagcaaagt ccc                                         143

SEQ ID NO: 3            moltype = DNA  length = 145
FEATURE                 Location/Qualifiers
source                  1..145
                        mol_type = other DNA
                        organism = synthetic construct
SEQUENCE: 3
gcaatcagca accgttttcg tggctttaca cttataaggg tgttaagaag cccatcagtc   60
tgataaggtt aagatattca ttcagtctat ttataatatt aacaatcgtt aagcgtacac  120
tctgtgcaaa aaacgcaaga gattc                                       145

SEQ ID NO: 4            moltype = DNA  length = 48
FEATURE                 Location/Qualifiers
source                  1..48
                        mol_type = other DNA
                        organism = synthetic construct
SEQUENCE: 4
acatcccttc acaggtagtg cttttagaaa agattcacca gtccaaca               48
```

```
SEQ ID NO: 5              moltype = DNA  length = 48
FEATURE                   Location/Qualifiers
source                    1..48
                          mol_type = other DNA
                          organism = synthetic construct
SEQUENCE: 5
tgttggactg gtgaatcttt tctaaaagca ctacctgtga agggatgt                    48

SEQ ID NO: 6              moltype = DNA  length = 21
FEATURE                   Location/Qualifiers
source                    1..21
                          mol_type = other DNA
                          organism = synthetic construct
SEQUENCE: 6
cagggcttcc acagtcacaa t                                                 21

SEQ ID NO: 7              moltype = DNA  length = 21
FEATURE                   Location/Qualifiers
source                    1..21
                          mol_type = other DNA
                          organism = synthetic construct
SEQUENCE: 7
ttcgctattg tgcagtttct c                                                 21

SEQ ID NO: 8              moltype = DNA  length = 24
FEATURE                   Location/Qualifiers
source                    1..24
                          mol_type = other DNA
                          organism = synthetic construct
SEQUENCE: 8
attgcaaaac aggcagcaaa gtcc                                              24

SEQ ID NO: 9              moltype = DNA  length = 21
FEATURE                   Location/Qualifiers
source                    1..21
                          mol_type = other DNA
                          organism = synthetic construct
SEQUENCE: 9
gcgcaacgta gaacaggaat t                                                 21

SEQ ID NO: 10             moltype = DNA  length = 79
FEATURE                   Location/Qualifiers
source                    1..79
                          mol_type = other DNA
                          organism = synthetic construct
SEQUENCE: 10
aattgttatc cgctcacaat tccacacatt atacgagccg gatgattaat tgtcaagatt       60
gaagcgcctt tactactcc                                                    79

SEQ ID NO: 11             moltype = DNA  length = 81
FEATURE                   Location/Qualifiers
source                    1..81
                          mol_type = other DNA
                          organism = synthetic construct
SEQUENCE: 11
tccggctcgt ataatgtgtg gaattgtgag cggataacaa tttcacacag gaaacagacc       60
atggagatgt tgtctggagc c                                                 81

SEQ ID NO: 12             moltype = DNA  length = 56
FEATURE                   Location/Qualifiers
source                    1..56
                          mol_type = other DNA
                          organism = synthetic construct
SEQUENCE: 12
agacccgttt agaggcccca aggggttatg ctagtcaacg cattatttta tcgccg           56

SEQ ID NO: 13             moltype = DNA  length = 60
FEATURE                   Location/Qualifiers
source                    1..60
                          mol_type = other DNA
                          organism = synthetic construct
SEQUENCE: 13
tggggcctct aaacgggtct tgaggggttt tttggtcata gtaatccagc aactcttgtg       60

SEQ ID NO: 14             moltype = DNA  length = 22
FEATURE                   Location/Qualifiers
```

-continued

```
source          1..22
                mol_type = other DNA
                organism = synthetic construct
SEQUENCE: 14
gagcaggtat ttacgtgaac cg                                        22

SEQ ID NO: 15       moltype = DNA  length = 56
FEATURE             Location/Qualifiers
source              1..56
                    mol_type = other DNA
                    organism = synthetic construct
SEQUENCE: 15
agtcctaggt ataatactag tggtgcctga cgaccataaa agttttagag ctagaa    56

SEQ ID NO: 16       moltype = DNA  length = 56
FEATURE             Location/Qualifiers
source              1..56
                    mol_type = other DNA
                    organism = synthetic construct
SEQUENCE: 16
ttctagctct aaaacttta tggtcgtcag gcaccactag tattatacct aggact    56
```

ESCHERICHIA COLI FOR SYNTHESIZING L-VALINE, CONSTRUCTION METHOD AND USE THEREOF

This application is a Continuation Application of PCT/CN2022/099472, filed on Jun. 17, 2022, which claims priority to Chinese Patent Application No. CN 202210277913.2, filed on Mar. 21, 2022, which is incorporated by reference for all purposes as if fully set forth herein.

A Sequence Listing XML file named "10015_0137.xml" created on Jan. 23, 2024, and having a size of 15,209 bytes, is filed concurrently with the specification. The sequence listing contained in the XML file is part of the specification and is herein incorporated by reference in its entirety.

FIELD OF THE INVENTION

The invention relates to the field of biotechnology, and particularly to an *Escherichia coli* for synthesizing L-valine, a construction method and use thereof.

DESCRIPTION OF THE RELATED ART

L-valine is an essential amino acid for human body, and is also an important cellular component and precursor of chemical substances. It has wide application potential in many fields such as medicine, food and feed. L-valine is also one of the four limiting amino acids in crude protein feed of young piglets and broilers, and its long-term deficiency has adverse effects on animal growth. In recent years, the demand for L-valine in animal feed additives has increased significantly, which has stimulated people's interest in producing L-valine more efficiently and economically. At present, L-valine is mainly produced by microbial fermentation, and mutagenesis or metabolic engineering modification strategies have been used to construct L-valine producing strains, but most of the currently reported L-valine producing strains still have problems such as low yield and productivity.

*Corynebacterium glutamicum* is a Gram positive bacterium, and is the most commonly used industrial microorganism for producing amino acids (including L-glutamic acid, L-lysine and BCAAs). In recent years, L-valine producing strains with *Corynebacterium glutamicum* as "microbial chassis" have been obtained by mutagenesis and systematic metabolic engineering. Strategies for constructing L-valine engineering bacteria of *Corynebacterium glutamicum* include enhancing key enzymes of synthesis pathway, overexpressing rate-limiting enzymes, balancing intracellular redox level, inhibiting competition pathway and enhancing extracellular transport pathway of L-valine. In addition to conventional metabolic engineering, adaptive evolution technology has also been applied to the construction of L-valine producing bacteria. Mahr et al. established a biosensor-driven adaptive evolution method to screen dominant evolutionary strains with improved L-valine yield and reduced by-products. Although some progress has been made in the engineering of *Clostridium glutamicum* strains, the low yield and productivity of L-valine by fermentation at present reduce the economic competitiveness.

*Escherichia coli* has a clear genetic background and is an attractive industrial production chassis in amino acid production. However, compared with *Corynebacterium glutamicum*, there are few reports on *Escherichia coli* strains producing L-valine, which may be due to the more complex regulation mechanism of *Escherichia coli* on L-valine biosynthesis. Acetylhydroxy acid synthase (AHAS) is a rate-limiting enzyme for L-valine biosynthesis. There are three AHAS isozymes encoded by ilvBN, ilvGM and ilvIH in *Escherichia coli*, which have different properties and regulation mechanisms. Park et al. reported the modification of the L-valine producing strain by systematic metabolic engineering of *Escherichia coli* W3110 and *Escherichia coli* W, and the final yield of L-valine reached 60.7 g/L, and the sugar-acid conversion rate was 0.22 g/g. Besides mutation breeding and conventional metabolic engineering modification, cofactor balance is also considered as the key bottleneck to improve L-valine yield. Intracellular cofactors affect metabolic network, signal transduction and material transport, affecting the physiological functions of microbial cells. In the process of producing chemicals by microbial fermentation, the titer and yield of chemicals are often limited by cofactor imbalance, which is mainly caused by the unbalanced expression of cofactor-dependent enzymes in the synthetic pathway. Savrasova and Stoynova et al. constructed an L-valine engineering strain with *Escherichia coli* MG1655 as a starting strain by replacing natural NADPH-dependent transaminase with heterologous NADH-dependent leucine dehydrogenase. Under microaerobic conditions, the glyco-acid conversion rate of this strain (0.23 g/g) was only 35.4% of the maximum theoretical yield of 0.65 g/g. Developing a high-throughput screening method for biosensors, introducing an exogenous coenzyme regeneration pathway to balance intracellular cofactors and constructing an efficient industrial chassis producing strain are the first key technical problem to be solved by the invention.

Pyruvate is the immediate precursor of L-valine synthesis and the central precursor of many metabolites, including acetyl-coenzyme A and L-alanine. Inactivation of the pyruvate dehydrogenase complex or direct blocking of the TCA cycle increases the carbon flux of L-valine biosynthesis. However, the attempt of this method has a great impact on cell growth. These results suggest that there is a trade-off between L-valine biosynthesis and cell growth with the distribution of pyruvate. The insufficient supply of pyruvate can explain the low yield of L-valine by fermentation. Oxygen-limited fermentation is a more direct and effective method to reduce TCA cycle. Under the condition of insufficient oxygen supply, *Escherichia coli* metabolizes glucose into organic acids without growing itself, and cells with stagnant growth but active metabolism can obtain higher yield and productivity. With the development of post-genome research, transcription factor (TF), as a tool to modify microbial metabolic pathway, has the unique advantage of "multi-point regulation", and can make up for the deficiency of single gene modification in metabolic engineering. In recent years, global transcription regulation factor (gTME) has attracted much attention because of its effective application in changing gene transcription to obtain beneficial cell phenotype. gTME is a method of modifying transcription factors, and can trigger the reprogramming of gene network and cell metabolic network, change the transcription efficiency of cells, and thus lead to the overall change of gene expression at the transcription level. Under hypoxia, many transcription factors in *Escherichia coli* participate in regulating cell metabolism. Although many studies have isolated and evaluated TFs involved in regulating amino acids (such as L-glutamic acid and L-lysine) and other secondary metabolites, the possible role of TFs responsive to L-valine in *Escherichia coli* has not been characterized.

SUMMARY OF THE INVENTION

In order to solve the above technical problems, the invention provides an *Escherichia coli* for synthesizing L-valine, a construction method therefor and use thereof. The invention significantly reduces the production cost of L-valine related products at the raw material level, allows enterprises to gain more market share in the fierce market competition, provides a new idea for constructing efficient and economical L-valine engineering strains, lays a theoretical foundation for efficient synthesis of L-valine, and has important value in both theory and practical application.

A first object of the invention is to provide an *Escherichia coli* for synthesizing L-valine. The *Escherichia coli* of the invention is designated as *Escherichia coli* W3110 and was deposited in China Center for Type Culture Collection (Address: Bayi Road, Wuchang District, Wuhan City, Hubei Province) under the Accession No. CCTCC M 2022293 on Mar. 18, 2022.

A second object of the invention is to provide a recombinant *Escherichia coli* for synthesizing L-valine. The recombinant *Escherichia coli* takes *Escherichia coli* as a starting strain, and a transcription regulation factor is overexpressed to obtain a recombinant *Escherichia coli*.

In an embodiment of the invention, the transcription regulation factor is a positive transcription regulation factor and/or a negative transcription regulation factor; the positive transcription regulation factor is a DNA binding transcription double regulator pdhR, a DNA binding transcription double regulator crp and a DNA binding transcription double regulator lrp; and the negative transcription regulation factor is RNA polymerase sigma factor rpoS.

In an embodiment of the invention, the KEGG number of the DNA binding transcription double regulator pdhR is JW0109; the KEGG number of the DNA binding transcription double regulator crp is JW5702; the KEGG number of the DNA binding transcription double regulator lrp is JW0872; and the KEGG number of the RNA polymerase sigma factor rpoS is JW1223.

In an embodiment of the invention, the recombinant *Escherichia coli* overexpresses dicarboxylic acid reductoisomerase gene ilvC, dihydroxy acid dehydratase gene ilvD and branched chain amino acid aminotransferase gene ilvE. The dicarboxylic acid reductoisomerase gene ilvC, the dihydroxy acid dehydratase gene ilvD and the branched chain amino acid aminotransferase gene ilvE are regulated and expressed through Ptrc promoter.

In an embodiment of the invention, the KEGG number of the dicarboxylic acid reductoisomerase gene ilvC is JW3747; the KEGG number of the dihydroxy acid dehydratase gene ilvD is JW5605; and the KEGG number of the branched chain amino acid aminotransferase gene ilvE is JW5606.

In an embodiment of the invention, branched-chain amino acid transporter gene brnQ is knocked out, branched-chain amino acid output protein gene brnFE is integrated into the site of the knocked-out branched-chain amino acid transporter gene brnQ, and double copies of the brnFE gene are made.

In an embodiment of the invention, the KEGG number of the branched-chain amino acid transporter gene brnQ is JW0391; and in the gene brnFE, the KEGG number of gene brnF is cg0314 and the KEGG number of gene brnE is cg0315.

In an embodiment of the invention, the recombinant *Escherichia coli* integrates phosphogluconate dehydratase gene edd and KHG/KDPG aldolase gene eda, and the phosphogluconate dehydratase gene edd and the KHG/KDPG aldolase gene eda are regulated and expressed through Ptrc promoter.

In an embodiment of the invention, the KEGG number of the phosphogluconate dehydratase gene edd is ZMO0368; and the KEGG number of the KHG/KDPG aldolase gene eda is ZMO0997.

In an embodiment of the invention, an operon ilvIH containing a mutation site is integrated into *Escherichia coli*, and the operon ilvIH includes ilvI (KEGG number JW007) and ilvH (KEGG number JW0077), wherein the mutation site is ilvH gene G41A or/and C50T. A specific mutation is that in ilvH gene, G at position 41 is mutated to A and C at position 50 is mutated to T.

In an embodiment of the invention, the transcription regulation factor is overexpressed by taking ptrc99A or ptrc28A as a vector.

A third object of the invention is to provide a method for constructing the recombinant *Escherichia coli* for synthesizing L-valine, including the following steps:
taking the deposited *Escherichia coli* as a starting strain, and overexpressing a transcription regulation factor, wherein the transcription regulation factor is a positive transcription regulation factor and/or a negative transcription regulation factor;
and/or overexpressing dicarboxylic acid reductoisomerase gene ilvC, dihydroxy acid dehydratase gene ilvD and branched chain amino acid aminotransferase gene ilvE;
and/or knocking out branched-chain amino acid transporter gene brnQ, integrating branched-chain amino acid output protein gene brnFE into the site of the knocked-out branched-chain amino acid transporter gene brnQ, and making double copies of the brnFE gene;
and/or integrating phosphogluconate dehydratase gene edd and KHG/KDPG aldolase gene eda to obtain the recombinant *Escherichia coli*.

In an embodiment of the invention, the positive transcription regulation factor is one or more of a DNA binding transcription double regulator pdhR, a DNA binding transcription double regulator crp and a DNA binding transcription double regulator lrp.

In an embodiment of the invention, the negative transcription regulation factor is RNA polymerase sigma factor rpoS.

A fourth object of the invention is to provide use of the deposited *Escherichia coli* or the recombinant *Escherichia coli* obtained by genetic engineering in fermentation synthesis of L-valine.

In an embodiment of the invention, conditions of the fermentation include: pyruvate as a precursor, a dissolved oxygen content of 10-20%, a fermentation time of 24-72 h, a temperature of 35-40° C., and a rotational speed of 210-230 rpm.

In an embodiment of the invention, seed medium (g/L): Glucose 20, Yeast Extract 10, Tryptone 6, $KH_2PO_4$ 1.2, $MgSO_4·7H_2O$ 0.5, $FeSO_4·7H_2O$ 0.01, $MnSO_4·H_2O$ 0.01, $V_{B1}$ 0.0013, and $V_H$ 0.0003, where the phenol red solution has a volume concentration of 2%, pH is controlled at about 6.5, and the medium is sterilized at a temperature of 115° C. and a pressure of 0.75 MPa for 15 min.

In an embodiment of the invention, fermentation medium (g/L): Glucose 20, Yeast Extract 2, Tryptone 4, $KH_2PO_4$ 2, Sodium Citrate 1, $MgSO_4·7H_2O$ 0.7, $FeSO_4·7H_2O$ 0.1, $MnSO_4·H_2O$ 0.1, VB1 0.008, and VH 0.0002, where the phenol red solution has a volume concentration of 2%, pH is controlled at about 7.0, and the medium is sterilized at a temperature of 121° C. and a pressure of 0.75 MPa for 15 min.

The technical solution of the invention has the following advantages compared to the prior art:
(1) The recombinant *Escherichia coli* for synthesizing L-valine constructs a biosensor based on the lrp type transcription regulation factor, obtains L-valine producing strains through ARTP mutagenesis and high-throughput screening, and strengthens L-valine synthesis pathway and transport system, to obtain chassis cells for efficiently producing L-valine. The yield of L-valine reaches 16.2 g/L.
(2) The recombinant *Escherichia coli* for synthesizing L-valine of the invention strengthens the expression of the positive transcription regulation factor pdhR, and inhibits the expression of the negative transcription regulation factor rpoS. The yield of L-valine reaches 17.4 g/L.
(3) The recombinant *Escherichia coli* for synthesizing L-valine of the invention introduces the Entner-Doudoroff pathway of *Zymomonas mobilis*, the genes $P_{trc}$-edd and $P_{trc}$-eda are overexpressed, and the yield of L-valine reaches 19.3 g/L.
(4) According to the invention, through comparative transcriptome analysis of L-valine producing strains under different dissolved oxygen conditions, transcription regulation factors related to L-valine metabolism are studied.
(5) The recombinant *Escherichia coli* for synthesizing L-valine of the invention is fermented in a 5 L fermentor with trace dissolved oxygen to test strains, the yield of L-valine reaches 112 g/L, and the OD of the bacterium is 104.

Deposition of Biological Materials

An *Escherichia coli* for synthesizing L-valine. The *Escherichia coli* of the invention is designated as *Escherichia coli* W3110 and was deposited in China Center for Type Culture Collection (Address: Bayi Road, Wuchang District, Wuhan City, Hubei Province) under the Accession No. CCTCC M 2022293 on Mar. 18, 2022.

BRIEF DESCRIPTION OF THE DRAWINGS

To make the content of the invention more comprehensible, the invention will be described in further detail below according to specific embodiments of the invention and in conjunction with the accompanying drawings, wherein:

FIG. 1 shows the yield of L-valine of recombinant strain CP17 identified at the 5 L fermentor level according to the invention.

DETAILED DESCRIPTION OF THE PREFERRED EMBODIMENTS

The invention will be further described below in conjunction with the accompanying drawings and specific embodiments, so that those skilled in the art can better understand and implement the invention, but the embodiments described are not intended to limit the invention.

The materials and methods involved in the following embodiments are as follows:
(1) Media:
Seed medium (g/L): Glucose 20, Yeast Extract 10, Tryptone 6, $KH_2PO_4$ 1.2, $MgSO_4 \cdot 7H_2O$ 0.5, $FeSO_4 \cdot 7H_2O$ 0.01, $MnSO_4 \cdot H_2O$ 0.01, VB1 0.0013, and VH 0.0003, where the phenol red solution has a volume concentration of 2%, pH is controlled at about 6.5, and the medium is sterilized at a temperature of 115° C. and a pressure of 0.75 MPa for 15 min.

Fermentation medium (g/L): Glucose 20, Yeast Extract 2, Tryptone 4, $KH_2PO_4$ 2, Sodium Citrate 1, $MgSO_4 \cdot 7H_2P$ 0.7, $FeSO_4 \cdot 7H_2O$ 0.1, $MnSO_4 \cdot H_2O$ 0.1, VB1 0.008, and VH 0.0002, where the phenol red solution has a volume concentration of 2%, pH is controlled at about 7.0, and the medium is sterilized at a temperature of 121° C. and a pressure of 0.75 MPa for 15 min.

(2) Gene knockout or integration: Referring to CRISPR/Cas9 gene editing technology, the system needs donor DNA fragment, pREDCas9 plasmid and pGRB cleavage plasmid for gene knockout or integration. pREDCas9 includes Red recombinant system, Cas9 protein expression system, pGRB elimination system, azithromycin resistance gene and temperature sensitive system, and the suitable temperature is 32° C. The pGRB plasmid contains gRNA-Cas9 binding region sequence, terminator sequence and ampicillin resistance gene, and the suitable temperature is 37° C. gRNA transcribed from pGRB carries Cas9 protein to recognize the target site of PAM (protospacer adjacent motifs) gene by base pairing, and realize double-strand break in DNA of interest. pGRB plasmid is constructed by recombining the fragment containing the target site of PAM gene with a linearized vector fragment.

(3) Transformation of pREDCas9 plasmid: The pREDCas9 plasmid is electroporated into the competent starting strain used in the invention, resuscitated for 2 h and coated on an LB plate containing azithromycin, and cultured in an incubator at 32° C. for 10-12 h. A single colony is selected for PCR verification to screen positive transformants.

(4) Transformation of pGRB and recombinant DNA fragments: Donor DNA and pGRB plasmid are electroporated into electrocompetent cells containing pREDCas9. Lambda-Red recombinase is induced by 0.1 mM IPTG for expression, resuscitated for 2 h and coated on an LB plate containing ampicillin and azithromycin, and cultured at 32° C. for 10-12 h. A single colony is selected for PCR verification. Positive recombinants are selected by colony PCR verification.

(5) Related primers involved in the present invention:

```
UP-yjiT-S:
                                  (SEQ ID NO: 1)
AATAGTTGTTGCCGCCTGAGT UP-yjiT-A:
                                  (SEQ ID NO: 2)
AGAGTGTACGCTTAACGATTGTTAATATTATAAATAGACTGAAT

GAATATCTTAACCTTATCAGACTGATGGGCTTCTTAACACCCTT

ATAAGTGTAAAGCCACGAAAACGGTTGCTGATTGCAAAACAGGC

AGCAAAGTCCC brnFE-S2:
                                  (SEQ ID NO: 3)
GCAATCAGCAACCGTTTTCGTGGCTTTACACTTATAAGGGTGTT

AAGAAGCCCATCAGTCTGATAAGGTTAAGATATTCATTCAGTCT

ATTTATAATATTAACAATCGTTAAGCGTACACTCTGTGCAAAAA

ACGCAAGAGATTC
```

-continued brnFE-A2:
(SEQ ID NO: 4)
ACATCCCTTCACAGGTAGTGCTTTTAGAAAAGATTCACCAGTCC
AACA DN-yjiT-S:
(SEQ ID NO: 5)
TGTTGGACTGGTGAATCTTTTCTAAAAGCACTACCTGTGAAGGG
ATGT DN-yjiT-A:
(SEQ ID NO: 6)
CAGGGCTTCCACAGTCACAAT brnFE-JD-S2:
(SEQ ID NO: 7)
TTCGCTATTGTGCAGTTTCTC brnFE-JD-A2:
(SEQ ID NO: 8)
ATTGCAAAACAGGCAGCAAAGTCC UP-yghX-S
(SEQ ID NO: 9)
GCGCAACGTAGAACAGGAATT UP-yghX-A:
(SEQ ID NO: 10)
AATTGTTATCCGCTCACAATTCCACACATTATACGAGCCGGATG
ATTAATTGTCAAGATTGAAGCGCCTTTACTACTCC ilvIH$^{mut}$-S1:
(SEQ ID NO: 11)
TCCGGCTCGTATAATGTGTGGAATTGTGAGCGGATAACAATTTC
ACACAGGAAACAGACCATGGAGATGTTGTCTGGAGCC ilvIH$^{mut}$-A1:
(SEQ ID NO: 12)
AGACCCGTTTAGAGGCCCCAAGGGGTTATGCTAGTCAACGCATT
ATTTTATCGCCG DN-yghX-S:
(SEQ ID NO: 13)
TGGGGCCTCTAAACGGGTCTTGAGGGGTTTTTTGGTCATAGTAA
TCCAGCAACTCTTGTG DN-yghX-A:
(SEQ ID NO: 14)
GAGCAGGTATTTACGTGAACCG gRNA-yghX-S:
(SEQ ID NO: 15)
AGTCCTAGGTATAATACTAGTGGTGCCTGACGACCATAAAAGTT
TTAGAGCTAGAA gRNA-yghX-A:
(SEQ ID NO: 16)
TTCTAGCTCTAAAACTTTTATGGTCGTCAGGCACCACTAGTATT
ATACCTAGGACT

EXAMPLE 1

An *Escherichia coli* for synthesizing L-valine and a construction method therefor, specifically including the following steps:
1. L-Valine Producing Strains are Obtained Through ARTP Mutagenesis and High-Throughput Screening.

The invention first constructs a biosensor based on an Lrp-type transcription regulation factor, and then uses an ARTP mutagenesis system to construct a mutant library of *Escherichia coli* W3110. The time of treatment of wild *Escherichia coli* using ARTP is set to 40 s, and its lethality is between 99.4%. About 5×100 single colonies are screened out on a 96-well microtiter plate. L-valine producing strains are obtained by multiple rounds of mutagenesis and screening. The highest producing strain is CP1. The producing strain CP1 is cultured in the seed medium at 37° C. and 220 rpm for 12 h, to prepare a seed culture. The prepared seed culture is inoculated in the fermentation medium at an inoculation amount of 2% (v/v), and cultured at 37° C. and 220 rpm for 24 h to prepare a fermentation broth. The yield of L-valine reaches 2.9 g/L.

Although the production of L-valine has achieved a zero breakthrough through ARTP mutagenesis, it is still necessary to strengthen the branch synthesis pathway from pyruvate to L-valine. The synthesis of L-valine from pyruvate involves three enzymes: dicarboxylic acid reductoisomerase (encoded by ilvC gene), dihydroxy acid dehydratase (encoded by ilvD gene) and branched chain amino acid aminotransferase (encoded by ilvE gene). The ilvED gene is first integrated by segmental integration. This gene carries exogenous cleavage plasmid sgRNA at the end. Then the ilvC gene is integrated at this gene locus. In order to enhance the metabolic carbon flow from pyruvate pool to L-valine, CP2 is constructed by using CP1 as a starting strain and integrating $P_{trc}$-ilvCDE into CP1, and fermented in a shake flask for 24 h. The yield of L-valine is 8.9 g/L and the bacterial OD is 36.1.

Efficient efflux and blocking of transport of L-valine into cells are effective strategies for reducing L-valine content in cells and weakening its feedback inhibition on key enzymes. There are two different transport systems for BCAAs in *Escherichia coli*. LivFGHMJ and LivFGHMK are two ATP-dependent high affinity BCAA transport systems. BrnQ is a low affinity BCAA transporter. The brnQ gene for L-valine uptake is knocked out to increase the yield of L-valine. BrnFE from *Corynebacterium glutamicum* (encoded by brnFE) has been proved to be an effective transporter of L-valine.

The brnFE gene is integrated into CP2 by taking CP2 as a starting strain, and upstream homologous arms (UP-brnQ-S and UP-brnQ-A3) and downstream homologous arms (DN-brnQ-S3 and DN-brnQ-A) of the gene locus brnQ as well as primers of the gene brnFE of interest (brnFE-S1 and brnFE-A1) are designed through primer 5. PCR amplification is performed by using the genome of *Escherichia coli* W3110 as a template to obtain upstream and downstream homologous arms and an intermediate fragment of interest, and then overlap PCR amplification is performed by using the recovered fragment as a template to obtain a donor DNA fragment. The pGRB plasmid containing the target site is constructed. Primers (gRNA-brnQ-S and gRNA-brnQ-A) are annealed to prepare a fragment containing a PAM gene target site, which is ligated with the linearized pGRB and transformed into chemically competent *Escherichia coli* DH5a. Positive colonies are selected to obtain pGRB-brnQ plasmid. The integrated fragment of brnFE gene and plasmid pGRB-brnQ are electroporated into electrocompetent cells containing pREDCas9 plasmid. The positive colonies containing the gene brnFE of interest are screened. The primers (brnFE-JD-S1 and brnFE-JD-A1) are identified, and plasmids pGRB-brnQ and pREDCas9 are both eliminated to obtain a strain CP3. This can further increase the yield of L-valine. The strain CP3 is fermented in a shake flask for 24 h. The yield of L-valine is 16.2 g/L and the bacterial OD is 39.4.

2. Comparative Transcriptome Analysis of L-Valine Producing Strains Under Different Dissolved Oxygen Conditions and Regulation of Transcription Regulation Factors The regulation of single-gene transcription level in metabolic pathway often cannot significantly improve the titer of target products, and even leads to the imbalance of carbon-nitrogen metabolic network and cofactor network. The global regulator (gTME) can activate or inhibit the co-expression of multiple genes in specific metabolic pathways, so transcription factors with specific functions can be expressed according to different metabolic regulation requirements, thus effectively increasing the synthesis of target metabolites. Comparative transcriptomics has been applied to analyze different transcription levels, and is an effective method to identify proteins that play an important role in the synthesis and metabolism of target products.

Trace dissolved oxygen can inhibit the TCA cycle of the competitive pathway of L-valine synthesis, so as to strengthen the branch pathway of L-valine synthesis. Transcriptome analysis of impact of different dissolved oxygen conditions on gene expression shows that *Escherichia coli* producing strain CP exhibits a significant difference in L-valine synthesis under different dissolved oxygen conditions. In order to identify the gene expression level under different dissolved oxygen conditions, L-valine producing strain CP3 is cultured at a 5 L fermentor level, and transcriptome is measured by sampling under different dissolved oxygen conditions. A 5 L fermentor test is carried out. Fed-batch fermentation is carried out in a 5 L bioreactor to simulate the impact of dissolved oxygen on L-valine production. Firstly, the strain is cultured at the fermentor level to 16 h. When the bacterial OD reaches the maximum, the ventilation is reduced, and the dissolved oxygen level in the fermentation broth is maintained at 30% by adjusting the ventilation and rotational speed. Then the high dissolved oxygen condition is still 30%. The high dissolved oxygen condition is used as a control group, designated as G01. Under a low dissolved oxygen condition, the dissolved oxygen level in the fermentation broth is maintained at 10% by reducing the ventilation and rotational speed. The low dissolved oxygen condition is used as an experimental group and designated as G02. After fermentation for 48 h, samples are taken for transcriptome measurement. As can be learned through the observation of the yield of L-valine, the yield of L-valine is 76 g/L under low dissolved oxygen and 65 g/L under high dissolved oxygen. Under low dissolved oxygen, after 30 h after inoculation, the yield of L-valine increases obviously, and the bacterial OD and glucose consumption rate remain unchanged.

Comparative transcriptome analysis of G01 and G02 samples shows that obviously distinct genes related to metabolism of *Escherichia coli* are selected and overexpressed. 10 transcription regulation factors related to carbon metabolism of *Escherichia coli* are selected. The genome of CP3 is ligated to ptrc99A plasmid and overexpressed to construct strains CP4-CP14 respectively (in which CP4 is a control group, that is, electroinjected with 99A empty plasmid). The results of 24 h shake flask fermentation test show that the positive transcription regulation factor is pdhR, crp and lrp, and the negative transcription regulation factor was RNA polymerase sigma factor rpoS. The results showed that the positive transcription regulation factor is DNA binding transcription double regulator pdhR, DNA binding transcription double regulator crp and a DNA binding transcription double regulator lrp, and the negative transcription regulation factor is RNA polymerase sigma factor rpoS.

For the strain CP9 constructed by overexpression of the gene pdhR, the yield of L-valine has the most significant increase, reaching 15 g/L, which is 37.6% higher than that of the control group. For the strains CP10 and CP11 constructed by overexpression of the genes crp and lrp, the yield of L-valine reaches 13 g/L and 12.1 g/L respectively, which are respectively 19.3% and 11.1% higher than that of the control group. In order to eliminate the impact of plasmid on the fermentation process, the plasmid test shows that the gene pdhR increases the yield of L-valine most significantly, and then the gene pdhR is integrated into the genome of CP3 to construct a strain CP15, in which case the yield of L-valine reaches 15.9 g/L.

Taking CP15 as a starting strain, the antisense strand of the gene rpoS is overexpressed. The antisense RNA complements and pairs with the mRNA of the gene rpoS normally expressed in cells, thus preventing the normal translation of the gene rpoS and achieving an inhibition effect. In order to eliminate the restriction of the gene rpoS on L-valine synthesis, a strain CP16 is constructed by overexpressing the antisense strand of the gene rpoS using antisense RNA interference strategy. Antisense RNA is used to inhibit the translation of mRNA encoded by the gene rpoS into rpoS. The results of shake flask fermentation show that the yield of L-valine reaches 17.4 g/L, exhibiting an increase of 9.4%.

3. Entner-Doudoroff Pathway is Designed Reasonably to Improve and Control NADPH Regeneration The Entner-Doudoroff pathway of *Zymomonas mobilis* is introduced, and intracellular redox balance is maintained through cofactor engineering, to realize self-balance of cofactors and promote efficient synthesis of target products. Insufficient supply of cofactors often affects the efficiency of biocatalysis. Under the condition of oxygen-limited fermentation, the supply of NADH is maintained vigorous through glycolysis metabolism, and NADH may even be overproduced. 2 mol NADPH is consumed for synthesis of every 1 mol L-valine, leading to imbalance of intracellular redox level. The invention systematically analyzes the production network of L-valine in *Escherichia coli* and designs a redox equilibrium route for synthesizing L-valine by glucose fermentation.

$$\text{Glucose} + 2\text{NADPH} = \text{L-Valine} + 2\text{NADH} \quad \text{(Equation 1)}$$

By constructing a balanced redox metabolic network to produce L-valine, a synergistic strategy is proposed. This design should reduce the pressure of cell growth while producing L-valine at high yield.

The genes $P_{trc}$-edd and $P_{trc}$-eda are integrated on the *Escherichia coli* genome CP16 to construct a strain CP17. The fragments $P_{trc}$-edd and $P_{trc}$-eda are used to form phosphogluconate dehydrase gene edd and KHG/KDPG aldolase gene eda in the genome of *Zymomonas mobilis*. For design of primers, a promoter is attached to the primers. The yield of L-valine reaches 19.3 g/L, which is 10.6% higher than that of the control group.

The gene brnFE is integrated by taking CP17 as a starting strain, and upstream homologous arms (UP-yjiT-S and UP-yjiT-A) and downstream homologous arms (DN-yjiT-S and DN-yjiT-A) of the pseudogene locus yjiT as well as primers of the gene brnFE of interest (brnFE-S2 and brnFE-A2) are designed through primer 5. PCR amplification is performed by using the genome of *Escherichia coli* W3110 as a template to obtain upstream and downstream homologous arms and an intermediate fragment of interest, and then overlap PCR amplification is performed by using the recovered fragment as a template to obtain a donor DNA fragment. The pGRB plasmid containing the target site is constructed. Primers (gRNA-yjiT-S and gRNA-yjiT-A) are annealed to prepare a fragment containing a PAM gene target site, which is ligated with the linearized pGRB and transformed into chemically competent *Escherichia coli* DH5α. Positive colonies are selected to obtain pGRB-yjiT plasmid. The integrated fragment of brnFE gene and plasmid pGRB-yjiT are electroporated into electrocompetent cells containing pREDCas9 plasmid. The positive colonies containing the gene brnFE of interest are screened. The primers (brnFE-JD-S2 and brnFE-JD-A2) are identified, and plasmids pGRB-yjiT and pREDCas9 are both eliminated to obtain a strain CP18.

The gene ilvIH$^{mut}$ is integrated by taking CP18 as a starting strain, and upstream homologous arms (UP-yghX-S and UP-yghX-A) and downstream homologous arms (DN-yghX-S and DN-yghX-A) of the pseudogene locus yghX as well as primers of the gene ilvIH$^{mut}$ of interest (ilvIH$^{mut}$-S1 and ilvIH$^{mut}$-A1) were designed through primer 5. PCR amplification is performed by using the genome of *Escherichia coli* W3110 as a template to obtain upstream and downstream homologous arms and an intermediate fragment of interest, and then overlap PCR amplification is performed by using the recovered fragment as a template to obtain a donor DNA fragment. The pGRB plasmid containing the target site is constructed. Primers (gRNA-yghX-S and gRNA-yghX-A) are annealed to prepare a fragment containing a PAM gene target site, which is ligated with the linearized pGRB and transformed into chemically competent *Escherichia coli* DH5α. Positive colonies are selected to obtain pGRB-yghX plasmid. The integrated fragment of ilvIH$^{mut}$ gene and plasmid pGRB-yghX are electroporated into electrocompetent cells containing pREDCas9 plasmid. The positive colonies containing the gene ilvIH$^{mut}$ of interest are screened. The primers (UP-yghX-S and DN-yghX-A) are identified, and plasmids pGRB-yghX and pREDCas9 are both eliminated to obtain a strain CP19.

EXAMPLE 2

Based on the strain CP19, fed-batch fermentation is carried out in a 5 L fermentor under a trace dissolved oxygen condition.

The dissolved oxygen condition is very important for synthesis of L-valine by fermentation. In the metabolic network of *Escherichia coli*, L-valine synthesis pathway and TCA cycle form a competitive relationship. By controlling the dissolved oxygen condition to inhibit aerobic respiration of cells, more precursor pyruvate is saved for L-valine synthesis. The dissolved oxygen condition is controlled at 10-20%, and the strains are fermented in a 5 L bioreactor under trace dissolved oxygen, with a fermentation cycle of 48 h. The results are as shown in FIG. 1. The yield of L-valine reaches 112 g/L and the bacterial OD reaches a maximum of 104.

Apparently, the above-described embodiments are merely examples provided for clarity of description, and are not intended to limit the implementations of the invention. Other variations or changes can be made by those skilled in the art based on the above description. The embodiments are not exhaustive herein. Obvious variations or changes derived therefrom also fall within the protection scope of the invention.

---

What is claimed is:

1. An *Escherichia coli* for synthesizing L-valine, wherein the *Escherichia coli* is designated as *Escherichia coli* W3110 and was deposited in China Center for Type Culture Collection (Address: Bayi Road, Wuchang District, Wuhan City, Hubei Province) under the Accession No. CCTCC M 2022293 on Mar. 18, 2022.

2. A recombinant *Escherichia coli* for synthesizing L-valine, wherein the recombinant *Escherichia coli* is an *Escherichia coli* for synthesizing L-valine designated as *Escherichia coli* W3110 as deposited in China Center for Type Culture Collection (Address: Bavi Road, Wuchang District, Wuhan City, Hubei Province) under the Accession No. CCTCC M 2022293 on Mar. 18, 2022, and comprising further modifications as follows:

dicarboxylic acid reductoisomerase gene ilvC, dihydroxy acid dehydratase gene ilvD and branched chain amino acid aminotransferase gene ilvE are overexpressed; branched-chain amino acid transporter gene brnQ is knocked out, and branched-chain amino acid output protein gene brnFE is integrated into the site of the knocked-out branched-chain amino acid transporter gene brnQ; phosphogluconate dehydratase gene edd and KHG/KDPG aldolase gene eda are integrated; and a transcription regulation factor is overexpressed to obtain the recombinant *Escherichia coli*, wherein the transcription regulation factor is a positive transcription regulation factor and/or a negative transcription regulation factor; the positive transcription regulation factor is selected form the group consisting of a DNA binding transcription double regulator pdhR, a DNA binding transcription double regulator crp and a DNA binding transcription double regulator lrp; and the negative transcription regulation factor is RNA polymerase sigma factor rpoS, and wherein the transcription regulation factor is overexpressed from a ptrc99A or ptrc28A vector.

3. A method for fermentation synthesis of L-valine, comprising:
providing the recombinant *Escherichia coli* according to claim 2; and performing a fermentation synthesis by fermenting a fermentation medium with the recombinant *Escherichia coli* to synthesize L-valine.

4. The method according to claim 3, wherein the fermentation synthesis is carried out in conditions of: pyruvate as a precursor, a dissolved oxygen content of 10-20%, a fermentation time of 24-72 h, a temperature of 35-40° C., and a rotational speed of 210-230 rpm.

5. A method for constructing a recombinant *Escherichia coli* for synthesizing L-valine, comprising:

providing an *Escherichia coli* for synthesizing L-valine designated as *Escherichia coli* W3110 as deposited in China Center for Type Culture Collection (Address: Bavi Road, Wuchang District, Wuhan City, Hubei Province) under the Accession No. CCTCC M 2022293 on Mar. 18, 2022, and in the *Escherichia coli* for synthesizing L-valine further introducing the following:

overexpressing a transcription regulation factor, wherein the transcription regulation factor is a positive transcription regulation factor and/or a negative transcription regulation factor; the positive transcription regulation factor is selected from the group consisting of a DNA binding transcription double regulator pdhR, a DNA binding transcription double regulator crp and a DNA binding transcription double regulator lrp; and the negative transcription regulation factor is RNA polymerase sigma factor rpoS;

and/or overexpressing dicarboxylic acid reductoisomerase gene ilvC, dihydroxy acid dehydratase gene ilvD and branched chain amino acid aminotransferase gene ilvE;

and/or knocking out branched-chain amino acid transporter gene brnQ, integrating branched-chain amino acid output protein gene brnFE into the site of the knocked-out branched-chain amino acid transporter gene brnQ, and making double copies of the brnFE gene;

and/or integrating phosphogluconate dehydratase gene edd and KHG/KDPG aldolase gene eda to obtain the recombinant *Escherichia coli*.

* * * * *